United States Patent
Lowe et al.

(10) Patent No.: US 11,257,524 B2
(45) Date of Patent: *Feb. 22, 2022

(54) SERVER SIDE CROSSFADING FOR PROGRESSIVE DOWNLOAD MEDIA

(71) Applicant: Sirius XM Radio Inc., New York, NY (US)

(72) Inventors: Raymond Lowe, Chester, NJ (US); Christopher Ward, Glen Ridge, NJ (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,321

(22) Filed: Jul. 30, 2019

(65) Prior Publication Data

US 2020/0202896 A1 Jun. 25, 2020

Related U.S. Application Data

(63) Continuation of application No. 15/706,820, filed on Sep. 18, 2017, now Pat. No. 10,366,725, which is a
(Continued)

(51) Int. Cl.
*H04B 1/00* (2006.01)
*G11B 27/038* (2006.01)
(Continued)

(52) U.S. Cl.
CPC .......... *G11B 27/038* (2013.01); *G06F 3/0481* (2013.01); *G06F 3/04847* (2013.01);
(Continued)

(58) Field of Classification Search
CPC .................................................. G11B 27/038
See application file for complete search history.

*Primary Examiner* — Shaun Roberts
(74) *Attorney, Agent, or Firm* — Kramer Levin Naftalis & Frankel LLP (57) ABSTRACT

In exemplary embodiments of the present invention systems and methods are provided to implement and facilitate crossfading, interstitials and other effects/processing of two or more media elements in a personalized media delivery service so that each client or user has a consistent high quality experience. The effects or crossfade processing can occur on the broadcast, publisher or server-side, but can still be personalized to a specific user, thus still allowing a personalized experience for each individual user, in a manner where the processing burden is minimized on the downstream side or client device. This approach enables a consistent user experience, independent of client device capabilities, both static and dynamic. The cross-fade can be implemented after decoding the relevant chunks of each component clip, processing, recoding and rechunking, or, in a preferred embodiment, the cross-fade or other effect can be implemented on the relevant chunks to the effect in the compressed domain, thus obviating any loss of quality by re-encoding. A large scale personalized content delivery service can be implemented by limiting the processing to essentially the first and last chunks of any file, since there is no need to processing the full clip. In exemplary embodiments of the present invention this type of processing can easily be accommodated in cloud computing technology, where the first and last files may be conveniently extracted and processed within the cloud to meet the required load. Processing may also be done locally, for example, by the broadcaster, with sufficient processing power to manage peak load.

8 Claims, 5 Drawing Sheets

Related U.S. Application Data continuation of application No. 14/516,884, filed on Oct. 17, 2014, now Pat. No. 9,767,849, which is a continuation-in-part of application No. 14/358,919, filed as application No. PCT/US2012/065943 on Nov. 19, 2012, now Pat. No. 9,406,303, and a continuation-in-part of application No. PCT/US2013/037013, filed on Apr. 17, 2013, and a continuation-in-part of application No. PCT/US2013/037034, filed on Apr. 17, 2013.

(60) Provisional application No. 61/687,049, filed on Apr. 17, 2012, provisional application No. 61/687,048, filed on Apr. 17, 2012, provisional application No. 61/607,532, filed on Mar. 6, 2012, provisional application No. 61/631,440, filed on Jan. 3, 2012, provisional application No. 61/561,593, filed on Nov. 18, 2011.

(51) Int. Cl.
  *G06Q 30/02* (2012.01)
  *G06Q 30/06* (2012.01)
  *G10H 1/00* (2006.01)
  *G11B 27/10* (2006.01)
  *G11B 27/32* (2006.01)
  *G06F 3/0481* (2022.01)
  *G06F 3/04847* (2022.01)
  *G06F 9/445* (2018.01)
  *G06F 9/50* (2006.01)
  *H04L 67/306* (2022.01)
  *G06F 3/16* (2006.01)
  *G10H 1/06* (2006.01)

(52) U.S. Cl.
  CPC ............ *G06F 3/165* (2013.01); *G06F 9/4451* (2013.01); *G06F 9/5066* (2013.01); *G06Q 30/02* (2013.01); *G06Q 30/0631* (2013.01); *G10H 1/0025* (2013.01); *G10H 1/06* (2013.01); *G11B 27/105* (2013.01); *G11B 27/322* (2013.01); *H04L 67/306* (2013.01); *G10H 2210/125* (2013.01); *G10H 2240/075* (2013.01); *G10H 2240/125* (2013.01); *G10H 2240/305* (2013.01); *G10H 2240/325* (2013.01); *G10H 2250/035* (2013.01); *G10H 2250/571* (2013.01)

Fig. 5 - Content Distribution System (Service Provider System) with Crossfade Segment Generator

SERVER SIDE CROSSFADING FOR PROGRESSIVE DOWNLOAD MEDIA

CROSS-REFERENCE TO RELATED APPLICATIONS

This is a continuation-in-part of PCT/2013/037013, which published as WO 2103/158787. As such, the present application claims priority to U.S. Provisional Patent Application Nos. 61/687,049, filed on Apr. 17, 2012 entitled SERVER SIDE CROSSFADE FOR PROGRESSIVE DOWNLOAD MEDIA, and 61/687,048, filed on Apr. 17, 2012 entitled SYSTEMS AND METHODS FOR IMPLEMENTING EFFICIENT CROSS-FADING BETWEEN COMPRESSED AUDIO STREAMS the entire disclosure of each which is hereby fully incorporated herein by reference. The present applicaiton also claims priority to (i) PCT/2013/037034, which published as WO 2013/158804, entitled SYSTEMS AND METHODS FOR IMPLEMENTING EFFICIENT CROSS-FADING BETWEEN COMPRESSED AUDIO STREAMS, and (ii) U.S. patent application Ser. No. 14/358,919, filed on May 16, 2014, and entitled SYSTEMS AND METHODS FOR IMPLEMENTING CROSS-FADING, INTERSTITIALS AND OTHER EFFECTS DOWNSTREAM, as well as its underlying application, PCT/US2012/065943, filed on Nov. 19, 2012, which itself claims the benefit of each of U.S. Provisional Patent Application Nos. (i) 61/561,593, filed on Nov. 18, 2011, (ii) 61/631,440, filed on Jan. 3, 2012, (iii) 61/607,532, filed on Mar. 6, 2012, and (iv) 61/687,049 the entire disclosure of each of which is also hereby fully incorporated herein by reference.

TECHNICAL FIELD

The present invention relates to digital media delivery and playback, and in particular to systems and methods for implementing cross-fading, interstitials and other effects/processing of two or more media elements on a downstream device so as to replicate, to the extent possible, the feel, sound and flow of broadcast programming or "DJ" (disc jockey) enhanced playlists.

BACKGROUND OF THE INVENTION

Media delivery of both audio and video programming relies heavily on the ability to provide crossfades, blends and other processing or interstitial effects, to both enhance the user experience and to provide high quality delivery to the customer.

In a traditional broadcast model, such as, for example, FM radio, or a national television network, these kinds of effects are typically generated at the broadcast station or headend, typically by an automation system. This approach to effect insertion works well because all users receive the same broadcast stream, and complex effects can be processed, implemented and tightly controlled at a single location. Moreover, the amount of processing required is both constant for a given effect and independent of the number of end users.

With modern multimedia delivery, especially systems that deliver a personalized experience, where each user receives different programming or content that (i) varies with time relative to all other users, and that (ii) is personalized, to a greater or lesser degree, for each user, this traditional model does not work. In a personalized service, all users receive a custom set of audio or video elements usually based on a customized playlist.

If blends, interstitial effects, processing or cross fading are required or desired between successive media elements in such a personalized stream, one approach is to push the burden of processing the effect or crossfade to the client device, including the responsibility to both manage the download of the various elements needed, with sufficient lead time. This approach is often sub optimal. Not all client devices may be capable of processing complex effects to deliver a high-quality user experience, for a variety of reasons. For example, some devices may not be capable of such processing because of processing power, memory size, power or other limitations of processing effects. Other devices may have been the zenith of their class at one time, but are now legacy devices, and as techniques for on device cross fading advance, their capabilities are no longer sufficient. This can easily lead to a spectrum of unsatisfactory user experiences.

What are thus needed in the art are systems and methods to address these problems of the prior art so as to implement and facilitate cross-fading, interstitials and other effects/processing of two or more media elements from the server side, and have the ultimate result easily effected and implemented on the downstream device.

SUMMARY OF THE INVENTION

Systems, methods and computer readable media are provided to implement and facilitate cross-fading, interstitials and other effects/processing of two or more media elements in a personalized media delivery service so that each client or user has a consistent high quality experience. The various effects or crossfade processing can occur on the broadcast, music service, publisher or other server-side, but can still be personalized to a specific user, thus still allowing for a personalized experience for each individual user, in a manner where the processing burden is minimized on the downstream side, or client device. This approach enables a consistent user experience, independent of client device capabilities, both static and dynamic. The cross-fade, for example, can be implemented after decoding the relevant chunks of each component clip, and then processing, recoding and rechunking. Alternatively, in a preferred embodiment, the cross-fade or other effect can be implemented on the relevant chunks to that effect in the compressed domain, thus obviating any loss of quality by re-encoding. A large scale personalized content delivery service can be implemented by limiting the processing to essentially the first and last chunks of any file, since there is no need to process the full clip. This type of processing can easily be accommodated in cloud computing technology, where the first and last files may be conveniently extracted and processed within the cloud to meet the required load. Processing may also be done locally, for example, by the broadcaster, with sufficient processing power to manage peak load.

DETAILED DESCRIPTION OF THE INVENTION:

In exemplary embodiments of the present invention, systems and methods are provided to implement and facilitate cross-fading, interstitials and other effects/processing of two or more media elements in a personalized media delivery service so that each client or user has a consistent high quality experience.

Thus, in exemplary embodiments of the present invention, the desired effects, for example, crossfade processing, can occur on the broadcast, publisher, music service, or other server-side, but may still be personalized to a specific user, thus allowing a personalized experience for each individual user in a manner where the processing burden is minimized on the downstream side, or client device. This approach enables a consistent user experience, independent of client device capabilities, both static and dynamic.

One contemporary method of media delivery is called "Progressive Download". According to this method, compressed audio or video bitstreams are encoded at the broadcast side and divided into chunks, for example, of mostly equal lengths. This chunking produces many small files which can easily be distributed over a low-cost infrastructure such as, for example, a web server. In addition, streams may be encoded using multiple bit rates, and a client device can switch between the streams, at file boundaries, to optimize playback quality at any given delivery rate. Examples of this kind of technique include, for example, Apple's HLS or Microsoft's Smooth Streaming. Players for this type of decoding and playback are able to seamlessly splice the discrete file chunks, and provide a smooth, uninterrupted playback of audio and video. In exemplary embodiments of the present invention, the chunking feature of Progressive Download can be leveraged to implement cross fading, blends and other interstitial processing/effects on the server side, as next described.

Exemplary Server Side Cross Fade: Sub-optimal Method

Figure 1:
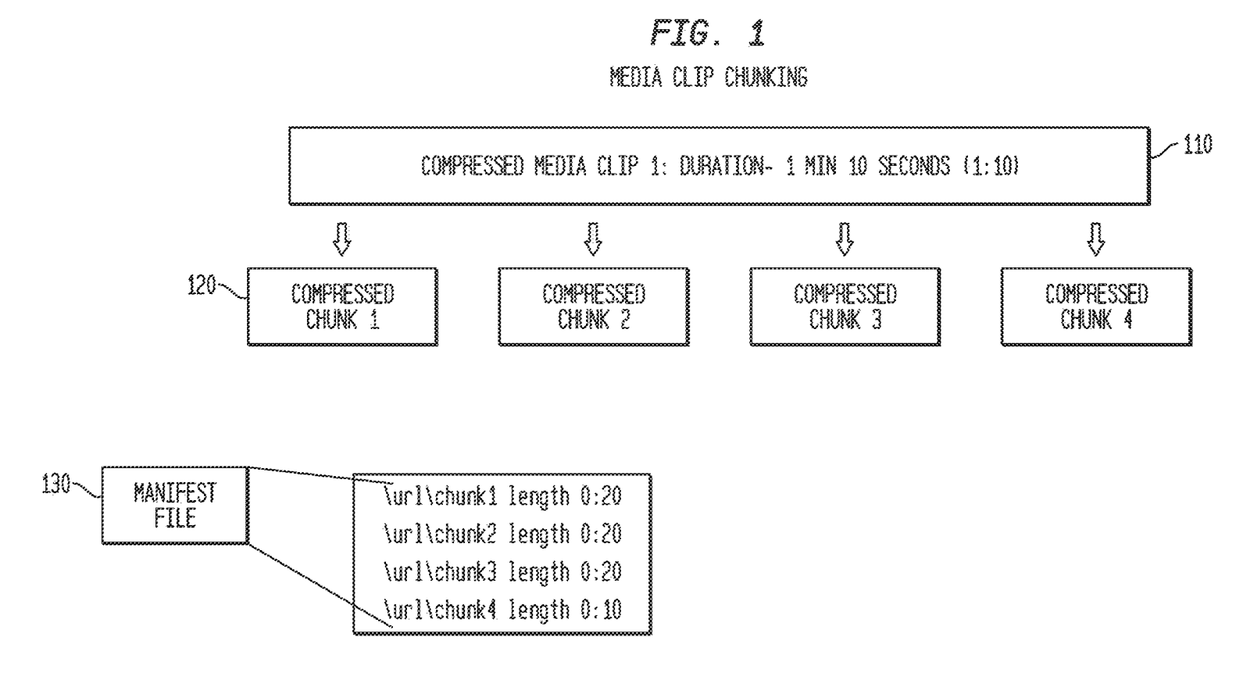
FIG. 1 illustrates Media Clip Chunking in a progressive download media delivery system.

FIG. 1 depicts an exemplary media file 110 of one minute and 10 seconds duration (1:10). In this exemplary case the chunk lengths are equal to 20 seconds. Here, for example, a broadcaster may encode the file using a media codec suitable for the purpose, and then divide or chunk the resultant output into, for example, four files: three files, each containing 20 seconds of content, and a fourth file containing only 10 seconds of content—the latter's length being different inasmuch as this last file contains the end of the audio or video. Usually four files such as these compressed chunks 120 would be made available for distribution, referenced by an Index or Manifest File 130. Such a Manifest File 130 may generally contain a pointer or URL to the four files in sequence, as well as a duration value for each file, as shown.

Figure 2:
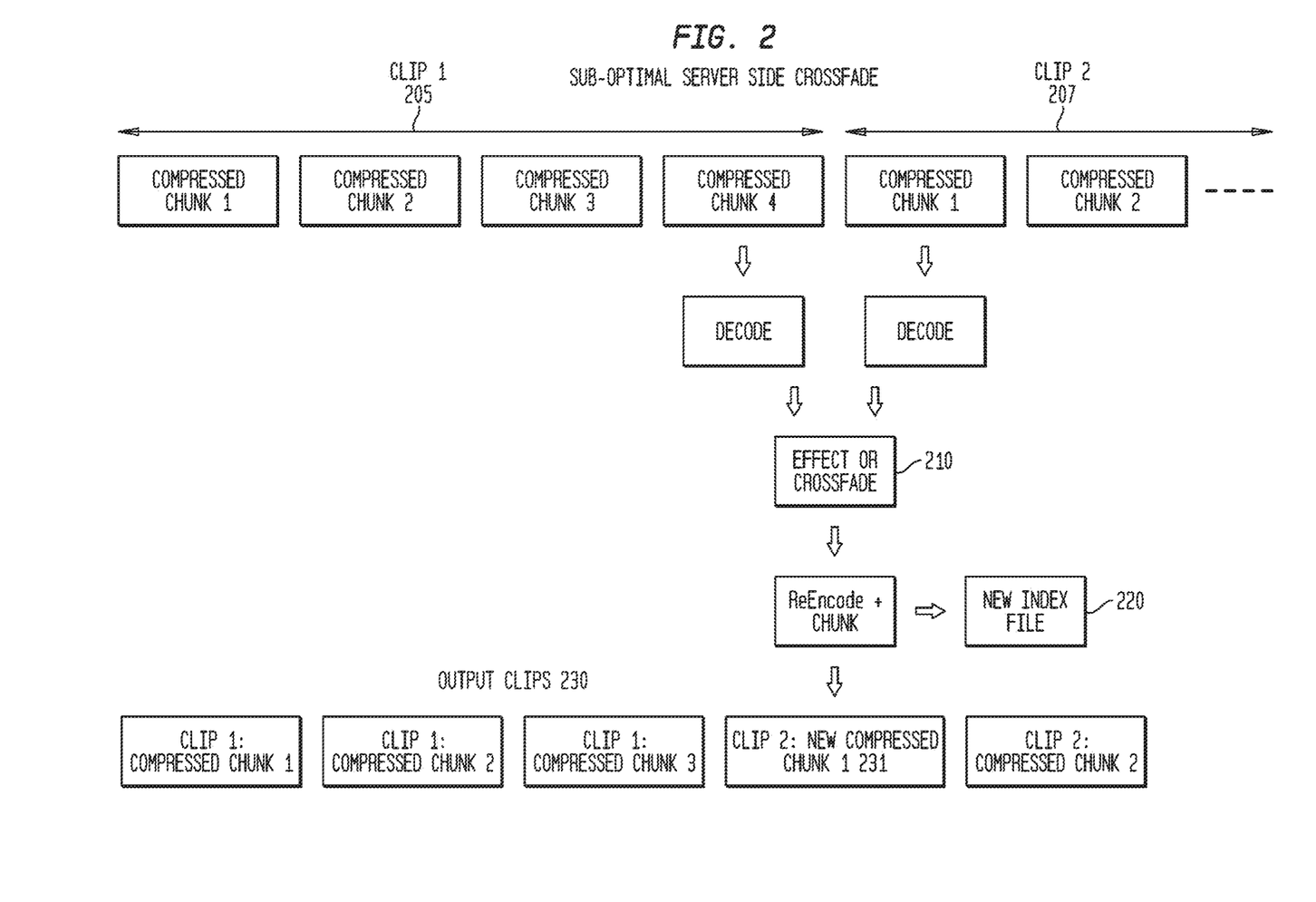
FIG. 2 depicts an exemplary Sub-optimal Server Side Crossfade technique according to exemplary embodiments of the present invention.

In the following illustrative description, with reference to FIG. 2, we assume a crossfade or other effect between the end of a first clip, Clip 1 205, and the beginning of a subsequent clip, Clip 2 207. Assuming the duration of the desired crossfade or other effect is shorter than the duration of the last chunk of Clip 1, which is, as shown in FIG. 2, Clip 1: Compressed Chunk 4, then Clip 1: Compressed Chunk 4 and Clip 2: Compressed Chunk 1 would be decoded to baseband, time aligned and processed with the desired effect. Such processing can be done in a crossfading module 210, which has stored, or can be passed, various parameters for implementing the crossfade, including, for example, (i) audio trajectory, (ii) fade or blend type, (iii) number of elements in the effect (e.g., 2, 3 or more, for complex voice-overs and other transitions), (iv) volume/attenuation levels for each component or element during the cross fade, and (v) intro and outro points, etc. Such parameters can, for example, be stored in crossfading module 210, as noted, or can be modified/updated by inferences from user behavior on the client device and sent via a message protocol to crossfade module 210 on the server side. In this context reference is made to Application No. PCT/US2012/65943, filed on Nov. 19, 2012, entitled SYSTEMS AND METHODS FOR IMPLEMENTING CROSS-FADING, INTERSITITALS AND OTHER EFFECTS DOWNSTREAM (the "Crossfade Application"), as well as its U.S. National Stage version, U.S. patent application Ser. No. 14/358,919, each under common assignment herewith, which describe various parameters and types of crossfades and other effects. Effectively, any crossfade or other effect that can be performed, as described therein, on a client device, can be implemented using various techniques according to the present invention, on the server side.

Returning to FIG. 2, after such decoding and processing the resultant effect or crossfade would then be re-encoded and chunked as shown in FIG. 2. This results in a new chunk, namely a "revised" Clip 2: New Compressed Chunk 1 231 being generated and a new custom index file 220 also generated (replacing Manifest File 130 of FIG. 1) to reflect the new output clip(s) 230 and modified clip duration. As can be seen, the last chunk of Clip 1 has been combined with the first chunk of Clip 2 to make a "revised" Clip 2: New Compressed Chunk 1, which contains the cross faded portions of the two clips, for example. Thus Clip 1 now only has three (3) chunks, as shown.

It is noted that in the example of FIG. 2 the cross fade or effect duration is less than 0:10, which was the original duration of Clip 1: Compressed Chunk 4 as shown in FIG. 1. In general, if the desired effect(s) or crossfade duration is less than that of the last chunk in the file, then only the last chunk of the file, Chunk N needs to be retrieved and processed. On the other hand, if the required crossfade (or other effect) duration is longer than the last chunk, then both final chunks, Chunk N and Chunk N-1 must be retrieved for processing.

Additionally, unless the last chunk of Clip 1 here—Clip 1: Chunk 4—or the first chunk of Clip 2—here Clip 2: Chunk 1, is equal to the crossfade length, the resultant chunk made from the last chunk of the prior clip, the first chunk of the subsequent clip and the overlap between them, will often be longer than the chunk length limit. In such cases there may, for example, be two "revised" chunks taking the place of, for example, original Clip 1: Chunk 4 and Clip 2: Chunk 1. For example, a last chunk of 3 second duration with a 2 second crossfade could either (a) produce a new 1 second chunk followed by a 20 second chunk which includes the crossfade, or (b) produce a 21 second chunk including the crossfade. In exemplary embodiments of the present invention, either option is valid.

The particular embodiment shown in FIG. 2, where prior to crossfade processing the relevant chunks are first decoded, is considered sub-optimal, as the audio or video is subject to quality loss upon re-encoding, if the codec is a lossy type, because of the requirement to decode and re-encode the content on the server side. If the codec in question is in fact lossless, then the technique of FIG. 2 would be considered optimal. However it is highly unusual to utilize lossless compression for co nsumer delivery, as significantly more bandwidth is typically required to deliver a given signal. Thus, in the real world, where nearly every codec is lossy, although this method achieves the cross fade result, there is a better way, as next described, which we term the "Optimal Method".

Exemplary Server Side Cross Fade: Optimal Method

Figure 3:
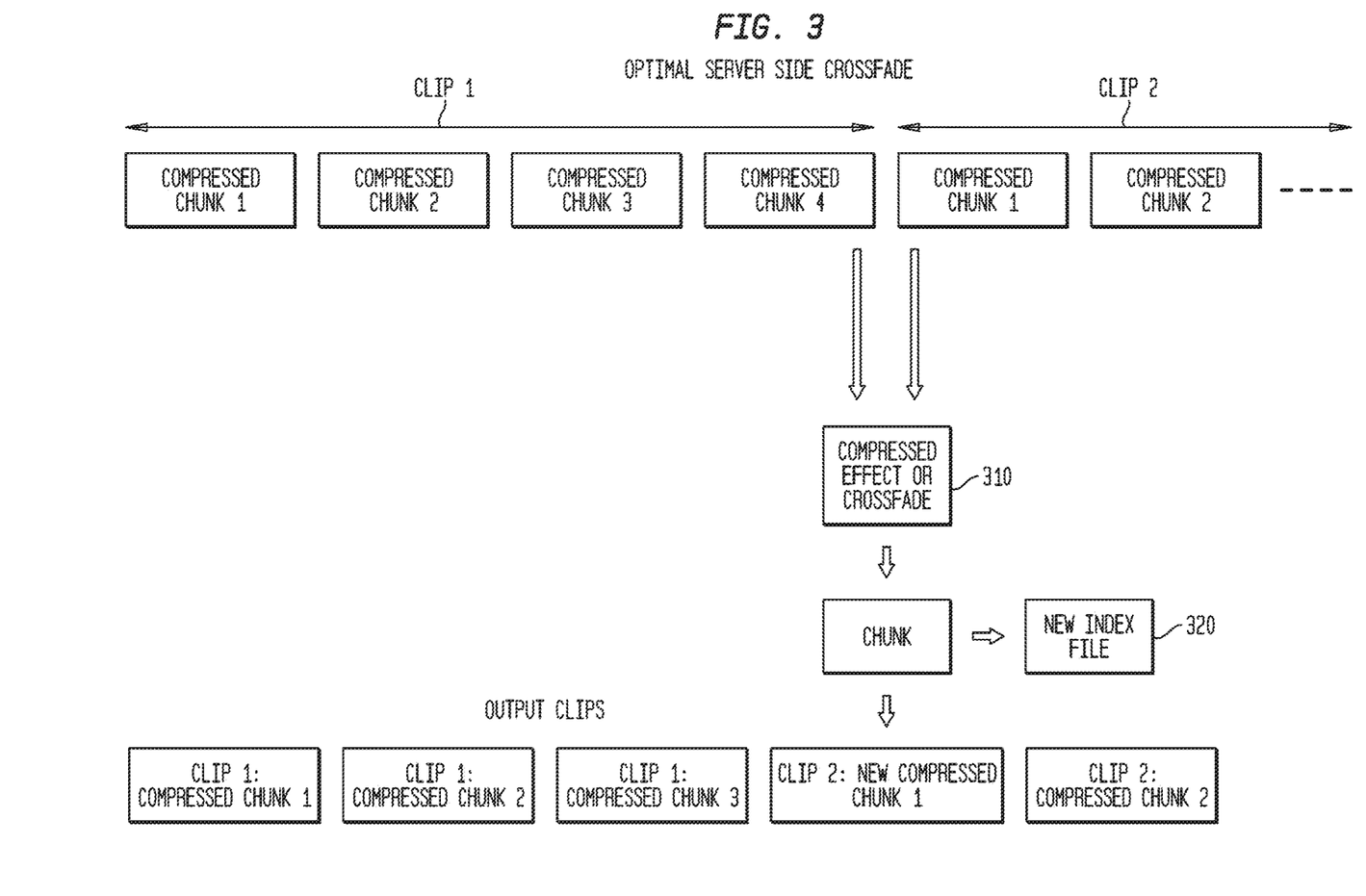
FIG. 3 depicts an exemplary Optimal Server Side Crossfade Technique according to exemplary embodiments of the present invention.

FIG. 3 depicts an optimal embodiment of server side crossfading with lossy compression. In this method, the same criteria are used to select Clip 1: Chunk 4 and Clip 2: Chunk 1 for the cross fade or other effect, as described above. The same parameters needed for Crossfade Module 310 may, for example, be passed to it via messaging, or pre-stored in it, as described above, and in the Crossfade Application. However, in this exemplary Optimal Method, the effect or crossfade occurs in the compressed domain—without any requirement to first decode to baseband for effect processing. This method allows preservation of the full quality of the signal, such that the output of this processing should be equal in quality to that of the input clips. Crossfade module 310 may thus combine compressed data from each relevant chunk to generate the new "revised" chunk(s), also containing compressed data. The precise mechanism of the compressed crossfade is described in detail in U.S. Provisional Patent Application No. 61/687,048 filed on Apr. 17, 2012, entitled SYSTEMS AND METHODS FOR IMPLEMENTING EFFICIENT CROSS-FADING BETWEEN COMPRESSED AUDIO STREAMS, and in PCT/2013/037034, published as WO 2013/158804 (the "Compressed Crossfade Applications"), under common assignment herewith. These applications describe various such mechanisms for compressed crossfading and similar effects. These applications are hereby incorporated herein by this reference, as noted above.

Core Chunks and Processed Chunks—Optimizing Personalized Service Delivery

Figure 4:
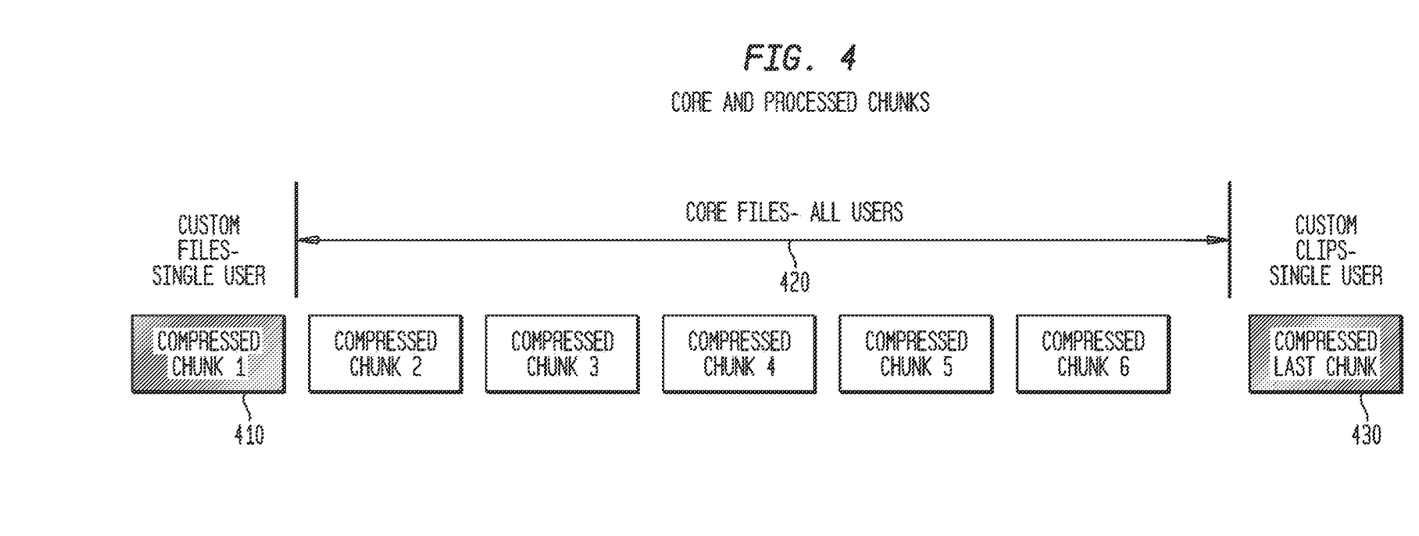
FIG. 4 illustrates Core and Processed Chunks according to exemplary embodiments of the present invention.

FIG. 4 illustrates a number of compressed chunks for a given exemplary file. As can be readily appreciated from the discussion of the exemplary server side cross-fade methods shown in FIGS. 2 and 3, in exemplary embodiments of the present invention one can take advantage of the fact that typically only the first and last compressed chunk, of an audio (or other content type) clip or stream needs to be processed. This significantly reduces the amount of processing that is required to support, for example, custom playlists and streaming.

Thus, FIG. 4 illustrates division of an audio clip into an initial compressed chunk 410 that is relevant to a cross fade or interstitial effect, multiple "core files" 420 that will not change and are not needed to implement the crossfade or effect, and a final relevant compressed chunk needed for any crossfade or blend with a subsequent clip. FIG. 4 clearly indicates that most files in the clip are generally considered core files 420 (e.g. compressed chunks 206) and therefore may be made available to all users without any modification. Each user will have at least one custom chunk 410 at the beginning of a file and one custom chunk 430 at the end of a file, where the cross fading or other effect, will occur. Each user may also have, for example, a custom index file which accounts for the naming and duration of these custom files.

As noted, if the desired effect(s) or crossfade duration is less than that of the last chunk in the file, then only the last chunk needs to be retrieved and processed. As also noted, if the required crossfade duration is longer than the last chunk N, then chunk N and second to the last chunk N-1 must be retrieved for processing. Similar considerations apply to the first chunk in the subsequent file. For example, as noted, if the crossfade duration is longer than 20 seconds as considered in the examples provided above, then both Chunk 1 and Chunk 2 of Clip 2 must be retrieved for processing.

As can thus readily be seen, by limiting the processing to essentially the first and last chunks of a file, techniques according to exemplary embodiments of the present invention can be successfully scaled to many hundreds of thousands, or even millions, of simultaneous users, since it does not require processing the full clip—as to any of the many clips in a given library. In exemplary embodiments of the present invention, this type of processing can easily be accommodated in cloud computing technology, where the first and last files may be conveniently extracted and processed within the cloud to meet the required load. Alternatively, processing may also be done locally, for example, by the broadcaster, or music service provider, with sufficient processing power to manage peak load.

Encryption of Content Clips

For security reasons, in exemplary embodiments of the present invention compressed audio chunks may be encrypted. If this is the case, decryption will be required for the first and last chunk (or, for example, additional chunks if the effect's duration exceeds a chunk length, as noted above) prior to processing. An alternate approach would be to allow the first and last chunks (or additional chunks, as noted) to remain unencrypted, which would alleviate the requirement for decryption, but not sacrifice security in any material way.

Server Side Crossfade System

Figure 5:
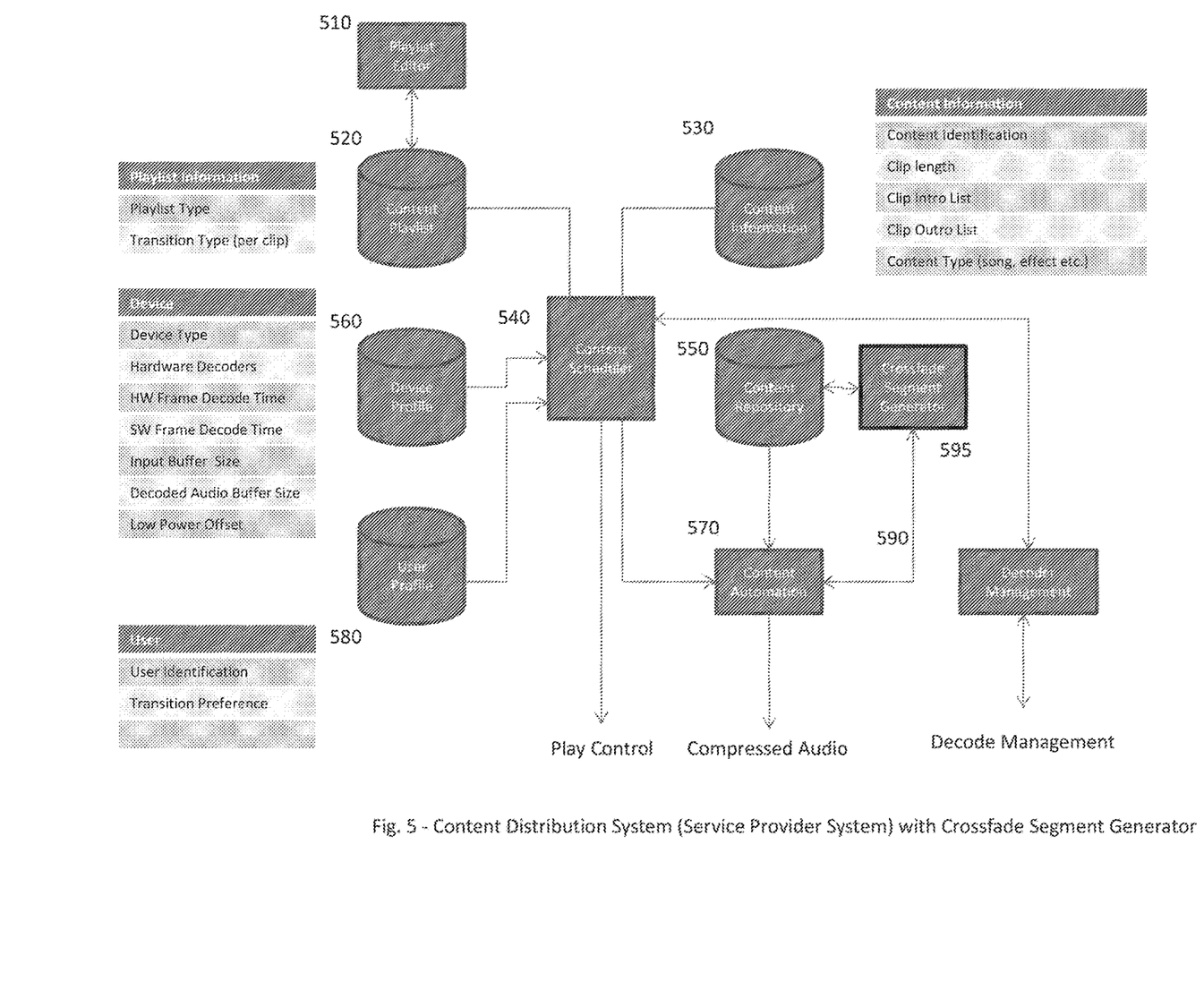
FIG. 5 depicts an exemplary content distribution system with crossfade segment generator according to an exemplary embodiment of the present invention.

Exemplary generation of server-side crossfade segments is illustrated in FIG. 5. FIG. 5 depicts a content delivery mechanism very similar to that described in U.S. patent application Ser. No. 14/358,919, referenced above, entitled SYSTEMS AND METHODS FOR IMPLEMENTING CROSS-FADING, INTERSTITIALS AND OTHER EFFECTS DOWNSTREAM, and in particular depicted in its FIG. 3, however here as augmented by the addition of Crossfade Segment Generator 595. In exemplary embodiments of the present invention, Crossfade Segment Generator 595 can take pairs of clips from content repository 550, optionally along with the user's preferences 580 (from User Profile database), and construct the clip-to-clip crossfade transition. Details of how to create a clip are provided, for example, in PCT/2013/037034, which published as WO 2103/158804, entitled SYSTEMS AND METHODS FOR IMPLEMENTING EFFICIENT CROSS-FADING BETWEEN COMPRESSED AUDIO STREAMS, which is referenced above. In exemplary embodiments of the present invention, the creation of this transition can be performed for each user either "on-demand"—based on Content Scheduler 540 providing content to the client, or, for example, performed ahead of the actual demand (i.e., pre-computing transitions between pairs of clips). In the event that the transition clip is created without consideration of a particular user, the content scheduler can be at liberty to reuse the transition clips for all users requested when the play-out sequence for an individual user demands the particular transition. I.e., Content Repository 550 can be populated with a cache of transition clips and accessed by a table where each entry is labeled with the "from-clip" and the "to-clip." In the event that the transition clip is created with consideration of a particular user (i.e., it is influenced by the user's preferences) then Content Scheduler 540 cannot reuse the transition clips between users. In such exemplary contexts Content Repository 550 can, for example, be populated with a cache of transition clips and accessed by a table where each entry is labeled with the user ID, the "from-clip" and the "to-clip", for example.

Exemplary Cross Fade (Client)

To illustrate a simple crossfade, involving two sequential songs using server side generated crossfade clips, the following example is provided.

An exemplary crossfade on an Andriod device was accomplished using two Media Players and setVolume( ) Crossfade using the transition clips works by playing the from-clip followed by the transition clip (constructed using techniques as described in PCT/2013/158804 for compressed domain crossfades, or by adding together the PCM (Pulse Code Modulation) values of the from-clip and to-clip over the transition interval for non-compressed domain crossfades).

FIG. 5 also provides additional details of an exemplary content service providers system. With reference again to FIG. 5, a Content Service Provider can include a Playlist Editor 510 which can be used to manage the distribution of content to clients. The choice as to content can be made, for example, as part of a personalized channel service, and can include, for example, preference engines and/or user defined parameters, as well as user feedback to songs or clips played to he or she, to determine what clips or songs to send each user on each of his or her "personalized channels." These playlists can be stored, for example, in a Content Playlist 520 which can be accessed, for example, by one or more Playlist Editor(s) 510. As shown in FIG. 5, the term "Playlist Information" as used herein, and as used for cross-fade or other processing purposes, can include a Playlist Type (e.g. Pop, Classical, Blues, etc.) and a Transition Type that is specified to be used to transition between content clips. Such a Transition Type can include, for example, a desired transition effect (such as, for example, a fade in, fade out, fade to voice over, etc.) as well as a transition trajectory (such as, for example, linear, non-linear, fast, slow, etc.). Thus the Playlist Type provides a characterization of the playlist, as noted above, and the Transition Type provides a characterization of a particular clip from an ingress to an egress, which can often be quite nonlinear as to both time (number of samples to play at each quantization level) and volume levels, and quite thus complex. Thus, in exemplary embodiments of the present invention, Playlist Type and Transition Type can be used together to provide parametric data as to how a given cross-fade (or other multi-clip processing effect) should occur, from both a timing as well as a trajectory perspective. For example, a Playlist Type for a "Heavy Metal" channel might indicate quick fades between successive clips. Similarly, Transition Type can provide a characterization of the transition between two clips that are to be cross-faded, independently of the Playlist Type. That is, Playlist Type provides a nuanced adjustment to how transitions between clips in a certain genre can be processed.

As an example, a Playlist Type can have four distinct functions that can be used for differing channels (or playlists), including, for example, a logarithmic function, a linear function and two sigmoid functions. The Playlist Type can also have parameters, which can be constants that adjust the trajectory of the function over the interval, as described below. Table I below provides exemplary values for such functions and parameters for four such Playlist Types, namely Heavy Metal, Easy Listening, Country and Rock.

TABLE 1

Example Playlist Types

| Playlist Type | Outro Time (sec) | OutroType | Outro ParamA | Intro Time | Intro Type | Intro ParamA |
|---|---|---|---|---|---|---|
| Heavy Metal | 1 | Linear | | | Linear | |
| Easy Listening | 4 | Arctan | 1 | 4 | Arctan | 1 |
| Country | 2 | Logarithmic | 2 | | Logarithmic | |
| Rock | 2 | Tanh | 2 | | Tanh | |

Similarly, Table II below provides exemplary Transition Types that can be applied in exemplary embodiments of the present invention.

TABLE II

Example Transition Types

| Transition Type | Time (sec) | Algorithm | ParamA | ParamB |
|---|---|---|---|---|
| LinearFadeInSlow | 2 | Linear | | |
| LinearFadeInFast | 1 | Linear | | |
| SmoothFadeInSlow | 3 | ArcTan | 1 | |
| SmoothFadeInFast | 2 | ArcTan | 2 | |
| QuickFadeOutSlow | 2 | ArcTan | 1 | |
| QuickFadeOutFast | 2 | ArcTan | 2 | |
| ZeroFadeIn | 0 | Linear | | |
| ZeroFadeOut | 0 | Linear | | |

Where the mathematical functions follow (i) some form of logarithm (as is popular in the broadcast community), (ii) a sigmoid function or (iii) some other monotonically increasing function, the parameters "ParamA" and "ParamB", as described in the two tables provided above can be, for example, constants which can adjust the slope of the function. For example, when using the tanh function, a parameter ParamA can be used such that tanh(Ax) is the actual value. It is noted that FIG. 3A of U.S. patent application Ser. No. 14/358,919, entitled SYSTEMS AND METHODS FOR IMPLEMENTING CROSS-FADING, INTERSTITIALS AND OTHER EFFECTS DOWNSTREAM, referenced above, provides a comparison of some exemplary Sigmoid functions. In that FIG. 3A (of that application) all of the functions are normalized in such a way that their slope at 0 is 1.

It is understood that these functions can, for example, be realized as a set of discrete values over the interval, and it is these (attenuation) values that can be downloaded as a table or array to a client device to be used to adjust the volume of the content during the fade. For example, a 1 second linear fade out with a sample rate of 44.1 KHz can be represented as 44,100 multipliers, each with the value 1 diminished by 1/44,100 for each sample from the start. (e.g., 1.0, 0.999909, 0.999818, 0.999727, etc). The tradeoff between storing and computing the function, as opposed to downloading and using a table (with interpolation between values as needed), is an engineering decision and can, in exemplary embodiments of the present invention, be context specific, based on the instruction set of the client and performance considerations, as understood in the art.

The interaction between the Playlist Type (which defines an overall experience for a particular type of Playlist, such as a Channel) and the Transition Type (which defines an experience between two successive clips independent of the Channel) is one of priority. Thus, in exemplary embodiments of the present invention, if there is no Transition Type defined between two adjacent clips then a standard Playlist Type transition for that Channel can be used. If, on the other hand, a Transition Type is defined for those clips, then the defined Transition Type can be used instead of a default Playlist Type transition.

Continuing with reference to FIG. 5, Content Information repository 530 can provide storage for metadata regarding each clip. In a typical content distribution system this can contain many attributes that describe the content, such as, for example, (i) Content Identification, (ii) Clip Length, (iii) A Clip Intro List, (iv) A Clip Outro List, and (v) Content Type. The clip intro list is a list of times relative to the start of a clip at which it is audibly pleasing to "enter" the clip during a cross-fade, such as, for example, at 1, 2, or 3.5 seconds from the start of the clip. Likewise, a clip outro list is a list of times relative to the end of a clip at which time it is audibly pleasing to "exit" the clip, such as, for example, at 1, 2.5, or 3.5 seconds prior to the end of the clip. Content Information 530 can thus be used by Content Scheduler 540 during scheduling of content for distribution. In exemplary embodiments of the present invention, an exemplary system can contain a Device Profile repository 560. Such Device Profile repository can include, for example, a characterization of various client devices, and their various versions or "flavors", including, for example, (i) Device Type (e.g., iPhone 4S, 5S, 6S, BlackBerry Curve, Droid RAZR, Samsung Galaxy etc.); (ii) a characterization of the number of hardware decoders on the device; (iii) the time taken for each hardware decoder to decode an audio frame; (iv) the time taken for the device to decode audio frames using its software decoder, (v) Input Buffer Size, (vi) Decoded Audio Buffer Size, and (vii) Low Power Offset, for example.

Information stored in Device Profile repository 560 can then, for example, be used by Content Scheduler 540 to schedule content for distribution and client device management. An example Device Profile table, Table III, with two sample entries, is provided below for illustrative purposes. In exemplary embodiments of the present invention the information provided in such a table allows an exemplary Content Scheduler 540 to optimize what content can be downloaded and played on a given device, and at what times.

TABLE III

Exemplary Device Profiles

| DeviceType | Hardware Decoders | HW Frame Decode Time (30 ms packet) | SW Frame Decode Time (30 ms packet) |
|---|---|---|---|
| SmartPhone | AAC+, MPEG 1, Layer 2 | 10 msec | 25 msec |
| LowCosPhone | N/A | | 25 msec |

In exemplary embodiments of the present invention, a system can further contain a Content Repository 550 which can be used, for example, to store actual audio clips in compressed form. In the exemplary system of FIG. 5, Content Repository 550 can provide content to Content Automation system 570 in accordance with directions from Content Scheduler 540. In general, content may be delivered from Content Automation system 570 to clients over a distribution channel as compressed content, using one of the many available compression formats, such as, for example, AAC+ or MPEG 1, Layer 2. It is noted that interstitials and voiceover clips are short in duration and may therefore alternatively be sent efficiently over a distribution channel in an uncompressed form, which puts a lesser burden on a decoder, especially one that runs more slowly (say, for example, at a maximum of 2X). Thus, to deliver content for an effect that requires, say, more than five (5) elements, if many of them are small enough to be sent in an uncompressed format, they can be directly stored to a decoded sample buffer on a client device, thus making it much easier to manage the decoder, for example, to only handle a few of the clips. Therefore, Content Repository 550 can be understood to include both compressed and uncompressed audio, as may be desirable in various exemplary embodiments of the present invention.

Coordination of the delivery of content to a client device can, for example, be accomplished by Play Control instructions issuing from Content Scheduler 540, and/or Client Device Control instructions issuing from Decoder Management 590 to particular client devices. Further, for example, Content Scheduler 540 may provide message communication regarding the availability of the playlists authored by Playlist Editor 510, and can also, for example, be responsible for allowing a client to obtain profile information regarding both devices and user preferences. Decoder Management 590 (also known as "Client Device Management" 590) can, for example, provide message communication regarding low level interactions between the service provider and the client with respect to delivery of clip elements to a particular user that are to be merged together. In general, such messages will reflect a "taxonomy" of variables, parameters, and data fields defined by the content distribution system as needed to adequately manage a client device downstream component to perform the various transition effects for any cross-fade.

Exemplary Implementations Any suitable programming language can be used to implement the routines of particular exemplary embodiments including, but not limited to, the following: C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for implementing efficient cross-fading between compressed audio streams, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation The above-presented description and accompanying figures are intended by way of example only and are not intended to limit the present invention in any way except as set forth in the following claims. It is particularly noted that persons skilled in the art can readily combine the various technical aspects of the various exemplary embodiments described into a wide variety of techniques, systems and methods, all being encompassed within the present invention. For the sake of clarity, it is noted that the term "crossfade" includes any transition, blend or interstitial effect implemented on or near a boundary between two successive content clips or files provided in a content delivery service or method.

What is claimed:

1. A method for implementing a server side crossfade or other transitional effect, the method comprising:
   identifying a plurality of media clips to use in the effect;
   determining, for each of the plurality of clips, multiple chunks to process for the effect;
   receiving the multiple chunks at a compressed crossfade module; and
   combining compressed data from each of the multiple chunks to generate a revised chunk containing the compressed data;
   wherein the revised chunk is equal in quality to the plurality of media clips.

2. The method of claim 1, further comprising creating a new index file for the revised chunk.

3. The method of claim 1, wherein the determining is performed via an algorithm that assesses the number of chunks to process for the effect.

4. The method of claim 3, wherein the algorithm inputs at least one of the following as parameters: (i) intra and outro information of each of the plurality of clips; (ii) type of the effect, and (iii) audio trajectory of the effect.

5. A non-transitory computer readable medium containing instructions that, when executed by at least one processor of a computing devices, cause the computing device to:
   identify a plurality of media clips to use in an effect;
   determine, for each of the plurality of clips, multiple chunks to process for the effect;
   receive the multiple chunks at a compressed crossfade module; and
   combine compressed data from each of the multiple chunks to generate a revised chunk containing the compressed data;
   wherein the revised chunk is equal in quality to the plurality of media clips.

6. The non-transitory computer readable medium of claim 5, further comprising instructions that, when executed by the at least one processor, cause the computing device to create a new index file for the revised chunk.

7. The non-transitory computer readable medium of claim 5, wherein the determining is performed via an algorithm that assesses the number of chunks to process for the effect.

8. The non-transitory computer readable medium of claim 7, wherein the algorithm inputs at least one of the following parameters: (i) intra and outro information of each of the plurality of clips; (ii) type of the effect, and (iii) audio trajectory of the effect.

* * * * *